US006316877B1

(12) United States Patent
Kaas

(10) Patent No.: US 6,316,877 B1
(45) Date of Patent: Nov. 13, 2001

(54) LAMP DEVICE AND A METHOD OF REGULATING THE LAMP INTENSITY

(76) Inventor: Povl Kaas, Th. Nielsens Gade 11 G, Herning DK-7400 (DK)

( * ) Notice: Subject to any disclaimer, the term of this patent is extended or adjusted under 35 U.S.C. 154(b) by 0 days.

(21) Appl. No.: 09/605,049

(22) Filed: Jun. 28, 2000

Related U.S. Application Data

(63) Continuation-in-part of application No. PCT/DK98/00585, filed on Dec. 29, 1998, now abandoned.

(30) Foreign Application Priority Data

Dec. 29, 1997 (DK) ........ 1548/97
Dec. 29, 1997 (DK) ........ 1549/97

(51) Int. Cl.[7] ........ H01J 7/44
(52) U.S. Cl. ........ 315/56; 313/539
(58) Field of Search ........ 315/56, 32, 326, 315/358; 313/484, 539, 545, 637, 643

(56) References Cited

U.S. PATENT DOCUMENTS 4,196,372 * 4/1980 Month et al. ........ 315/10
4,322,658 * 3/1982 Minarczyk ........ 315/47
4,924,133 * 5/1990 Dassler et al. ........ 313/25
5,406,172 * 4/1995 Bennett ........ 315/112
5,955,841 * 9/1999 Moisin et al. ........ 315/56

* cited by examiner

*Primary Examiner*—Don Wong
*Assistant Examiner*—Thuy Vinh Tran
(74) *Attorney, Agent, or Firm*—Jacobson Holman, PLLC

(57) ABSTRACT

A lamp device comprises a UV intermediate pressure lamp tube (1), arranged in an outer globe (2) mounted in a socket (4). Sealing means (5, 6, 7, 8, 9) enclose the outer globe (2) in order to ensure mutual vacuum-tight mounting of socket (4) and outer globe (2). The lamp device is suitable for application in a UV system for photochemical water purification. A control system comprises device for temperature measurement of an inactive gas in the outer globe and device for regulating the tube voltage of the lamp tube. Controlling the tube voltage of the lamp tube increases service life of the lamp and ensures uniformity in the electromagnetic radiation (UV light) emitted by the lamp. The UV lamp is replaceable in the remaining part of the lamp device.

26 Claims, 2 Drawing Sheets

LAMP DEVICE AND A METHOD OF REGULATING THE LAMP INTENSITY

CROSS-REFERENCE TO RELATED APPLICATIONS

This is a continuation-in-part of International Patent Application PCT/DK98/00585 with an international filing date of Dec. 29, 1998, now abandoned. This application is based on application No. 1548/97 and on application No. 1549/97, both filed in Denmark on Dec. 29, 1997, the contents of which are incorporated hereinto by reference.

BACKGROUND OF THE INVENTION

1. Field of the invention

The present invention relates to a lamp device comprising a lamp tube, such as a UV lamp arranged in an outer globe having at least one opening which is closed by a socket through which there are electrical connections to the lamp tube. The invention also relates to a system comprising a lamp device and to a method of adjusting it.

Today, lamp devices for many purposes are known. Thus, for use in ultraviolet irradiation, it is known to use a mercury-dosed lamp arranged inside an outer globe and sealed in a socket, which is exteriorly provided with threads in order to be screwed into a corresponding socket for mounting.

Such UV intermediate pressure lamps are used inter alia in UV systems where it is important that the intensity of the ultraviolet light is sufficiently energy-rich, and that the wavelength of the radiation is reasonably uniform during the service life of the lamp. Such UV intermediate pressure lamps typically have a service life of about 1–3000 hours, following which they must be replaced. The termination of the useful life of the lamp is typically due to the lamp tube having become leaky.

When a lamp has burnt out, and it has been replaced, it is generally discarded as waste, even though it does contain some elements that could still be put to use. This disposal constitutes an environmental problem, as the lamp contains environmentally toxic materials. Such a disposal may moreover be considered to be a waste of resources since the lamp contains expensive materials. Pure quartz glass or synthetic quartz glass is expensive and cannot be molten down, as the quartz evaporates before it melts.

The lamp tube is dosed with mercury and/or other metals. Further, an inactive gas, such as argon or the like, has been added. In this connection, a distinction is made between low and intermediate pressure lamps.

These lamps are optimized to yield as much ultraviolet light as possible. Additional focus for the further development of UV lamps is the lamp power, at the same time as the lamps are made smaller and manufactured with a smaller diameter, in particular when low-pressure lamps are involved.

These trends, however, make the lamps more sensitive to temperature. It has thus been found that fluctuations in the surface temperature of a lamp results in a reduction in the service life and a great drop in the efficiency of the lamp.

In the manufacturing of a UV low-pressure lamp, the rated emission of the lamp is determined at a specific vapor pressure. In this connection, tests have shown that a change in the surface temperature of 5° C. relative to the ideal surface temperature of the lamp may result in a reduction in the ultraviolet light (the electromagnetic radiation) in the form of both UV light intensity and change in the wavelengths of the light of 20%. This has turned out to be a problem in connection with UV lamps for disinfection of water or air as well as for inactivation of bacteria, virus, etc.

For intermediate pressure lamps in particular, the high burning temperature has the result that any joints in the lamp get leaky sooner or later, whereby air and water vapors penetrate into the lamp. Joints exist in lamps that are directly pressed together at the lamp ends in connection with the electrodes. This is seen clearly, as the gas of the lamp gets yellow or black, soon to be followed by the burnout of the lamp. A too low temperature of the lamp may cause the ionization covering to be deposited (condensed) on the inner side of the quartz lamp glass. This is seen in that the ends of the lamp become silver-colored.

Achieving and maintaining the correct surface temperature is particularly important in order to derive full benefit from the use of metal halide lamps, which are UV lamps which have been metal-dosed to achieve electromagnetic radiation within a specific range of wavelengths. This has been found to be a problem e.g. connection with UV lamps for photochemical processes where the wavelengths of the ultraviolet light may be decisive for the effect of the process relative to the individual substances.

A system of the prior art, developed for overcoming this problem, comprises a control system in which the tube voltage of the lamp is controlled by a light meter. The control operates in such way, that any decrease in the light intensity is detected by the light meter, which signals this to a control unit, which then increases the tube voltage of the lamp in order to compensate. However, an increase in the tube voltage also increases the surface temperature, which may rise to above the optimum level and enter a range, wherein the light intensity does not rise any further or, maybe, even decreases. This may prompt the control to call for still higher tube voltage, which may have the effect that the control will then contribute to additionally impairing the luminous efficacy of the lamp. Furthermore, also the service life of the lamp will be shortened.

2. Description of the Prior Art

U.S. Pat. No. 5,220,235 to Wakimizu et al discloses a lamp device where, in the outer globe, air is circulated through a socket for cooling. The UV radiation in the globe generates ozone, which is extremely toxic, and which moreover degrades the lamp, by way of the electrical terminals becoming oxidized. The outer globe is provided with a coating to retain harmful UV radiation, and is therefore this lamp is not of a type suitable for emitting a high output of UV radiation.

U.S. Pat. No. 4,963,783 to Grossman discloses an electroded mercury lamp for photochemical purposes. A sealed lamp envelope, which contains mercury vapor, is surrounded by an elongated quartz cylinder tube which defines a region for controlling a heat exchange medium which controls the temperature of the inner, sealed lamp envelope. The outer jacket allows for the use of a gas purge. Further, the outer jacket is designed to be demountable, in order to permit the interchange of different inner lamp envelopes. A tapered stopper is disposed at each end of the outer jacket and serves to guide and position an electrode lead through both the stopper and the outer jacket. The tapered stoppers also contain openings, which provide for an inlet and outlet stream of circulating heat transfer medium, which is preferably water.

Accordingly, it is an object of the invention to provide a lamp device that overcomes the above-mentioned drawbacks of the known lamp types. It is a further object of the invention to provide a longer service life for the lamp. Another object of the invention is to provide a system that ensures a longer service life and more constant luminous efficacy of the lamp tube, both as regards light intensity and the wavelengths of the emitted electromagnetic radiation.

SUMMARY OF THE INVENTION

The invention in a first aspect provides a lamp device comprising a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, and wherein said lamp tube is made of aluminum ceramic oxide with a binder that allows passage of electromagnetic radiation in the range 100–300 nm, such as MgF or $Li_2F$.

The use of a lamp tube of aluminum ceramic oxide with a binder such as MgF or $Li_2F$ which allows passage of UV light in the low range, e.g. 100–300 nm, avoids internal reflection of photons and makes the lamp as transparent as possible. Further the lamp operating temperature may exceed the melting temperature in respect of quartz glass. The socket is composed of elements comprising a plug for closing an end opening in the outer globe, said plug having a part inserted in the globe and being connected with the lamp tube, and an outer part, and the outer part and the end area of the outer globe are enclosed by sealing means to ensure mutual vacuum-tight mounting of the socket and the outer globe.

With a lamp device according to the invention it is possible to re-use the socket of the lamp tube in a new lamp device, when the first lamp tube has burnt out. The outer globe can also be cleaned and re-used in a new lamp device. The individual elements may thus be re-used directly or after a cleaning, which means that it is only very few components which must be disposed of when the lamp is replaced. This provides both an environmentally friendly solution and an economic saving in connection with the lamp replacement, as it is merely the lamp tube that has worn out and must be replaced. As the outer globe is re-used, the invention can also make it economical to use an outer globe of the more attractive, but also considerably more expensive sapphire glass.

In connection with testing and verification of the sealing for the socket it has been realized by the inventor that it is possible to adjust the vacuum inside the outer globe. The sealing means moreover have the effect that the socket is vacuum-tight, which is important in particular when using a lamp device according to the invention in a UV filter for photochemical water purification.

According to a preferred embodiment, the outer globe contains an inactive gas, e.g. nitrogen, argon, helium and xenon, and the gas in the globe is under vacuum, preferably about 500 mB, the wavelength of particularly the electromagnetic radiation, the UV light, from the lamp tube may be controlled. Also a long life of the lamp is achieved hereby. Another and important advantage is that when the outer globe is filled with inactive gas and sits freely in the air or is partly immersed into water, no ozone, which is harmful to the environment and is also a health hazard, can be formed by UV lamps with wavelengths$\leqq$190 nm.

The invention, in a second aspect, provides a lamp device comprising a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, and wherein said plug comprises a channel and a vacuum valve arranged in said channel, adapted for permitting selective opening for the purpose of scavenging said enclosed volume.

By providing in the socket a vacuum-tight valve in the channel, the outer globe may, after completed assembly, be scavenged with an inactive gas and be evacuated during the same stage of operation.

According to a preferred embodiment, the plug part inserted into the outer globe is formed with ring-shaped barb flanges, preferably of FPM (fluorocarbon) or FFKM (perfluorocarbon), in order that the plug is firmly engaged in the outer globe once it has been pushed in. The barb flanges are preferably dimensioned with an oversize diameter relative to the opening in the outer globe. The plug is made of an insulating material, which is vacuum-tight, preferably aluminum ceramic oxide.

According to a preferred embodiment, a means for temperature measurement is passed through the plug, in order to adapt the lamp device for temperature measurement inside the outer globe. This allows for measuring the temperature of the lamp tube indirectly and for controlling it, e.g. through regulation of the temperature, the pressure or the like of the gas in the outer globe, with the benefit that the service life of the lamp may be prolonged considerably.

According to a preferred embodiment, the sealing means comprises at least one clamping ring which is pushed on the part of the socket inserted in the outer globe, and the socket device is finally coated with a rubber cap, in order to provide an extremely tight and easily mountable assembly of the socket in a lamp device according to the invention.

The invention, in a third aspect, provides a system comprising a lamp device, which lamp device comprises a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, and wherein said lamp tube is made of aluminum ceramic oxide with a binder that allows passage of electromagnetic radiation in the range 100–300 nm, such as MgF or $Li_2F$, said enclosed volume comprising a filling of inactive gas, a temperature sensor inside said outer globe for temperature measurement of the inactive gas and control means for controlling a voltage fed to the lamp tube in order to control the intensity of the electromagnetic radiation in selected wavelengths.

By way of controlling the lamp in response to the temperature of the inactive gas, a prolonged service life of the lamp is achieved, and uniformity in the electromagnetic radiation of the lamp (UV light) may be preserved during service, both as regards the emitted radiation energy and the emitted wavelengths of the radiation in the entire service life of the lamp.

A special use of a regulation device according to the invention is in connection with a so-called metal halide lamp which is made of a aluminum ceramic oxide with a binder such as MgF or $Li_2F$, which allows passage of the electromagnetic radiation in the lower UV range e.g. 100–300 nm, where the lamp is dosed with special metals to provide a selected range of UV wavelengths. Such lamps are extremely sensitive to low temperature on the surface of the lamp tube, and it is therefore advantageous to use a regulation device according to the invention for a metal halide lamp for controlling the gas temperature in the outer globe.

According to an embodiment, the control means comprises a control unit adapted for receiving temperature measurements from the temperature sensor and for regulating the tube voltage of the lamp to achieve a desired gas temperature. By measuring the temperature of the gas near the face which is to be temperature-controlled, it is possible to achieve a rapid and precise regulation of the surface temperature of the lamp tube. According to a preferred embodiment, a light meter, such as a UV sensor, is moreover connected to the control unit. This allows control of both parameters. However, in this case, the control unit is adapted such that the gas temperature measurements have the highest priority in the regulation.

According to a preferred embodiment, the system may be provided with a monitoring unit adapted for permitting monitoring of the status of the lamp tube. With this addition, it is possible to output data and thereby currently monitor the state of the lamp.

According to a preferred embodiment, the system is provided with a temperature control of the inactive gas to prevent undesirable change in the tube voltage of the lamp if the surface temperature of the lamp is below or above the ideal surface temperature.

This is used to put a limit to the loading of the lamp, whereby the lamp will not be subjected to overloading. This is of particular advantage in case the voltage is regulated in steps.

The invention, in a fourth aspect, provides a method of regulating the intensity of electromagnetic radiation in selected wavelengths from a lamp device, which lamp device comprises a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said enclosed volume contains a filling to a pressure of about 500 mB of an inactive gas, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, and wherein said lamp tube is made of aluminum ceramic oxide with a binder that allows passage of electromagnetic radiation in the range 100–300 nm, such as MgF or $Li_2F$, said method comprising measuring a temperature at a point inside said outer globe and controlling the voltage fed to said lamp tube in order to maintain a predetermined temperature at said point.

BRIEF DESCRIPTION OF THE DRAWINGS

The invention will be described more fully below with reference to the accompanying drawings, in which.

BEST MODE FOR CARRYING OUT THE INVENTION

The figure is schematic and not necessarily to scale and illustrate only those parts which are essential in order to enable those skilled in the art to understand and practice the invention, whereas other parts are omitted from the drawings for the sake of clarity.

Figure 1:
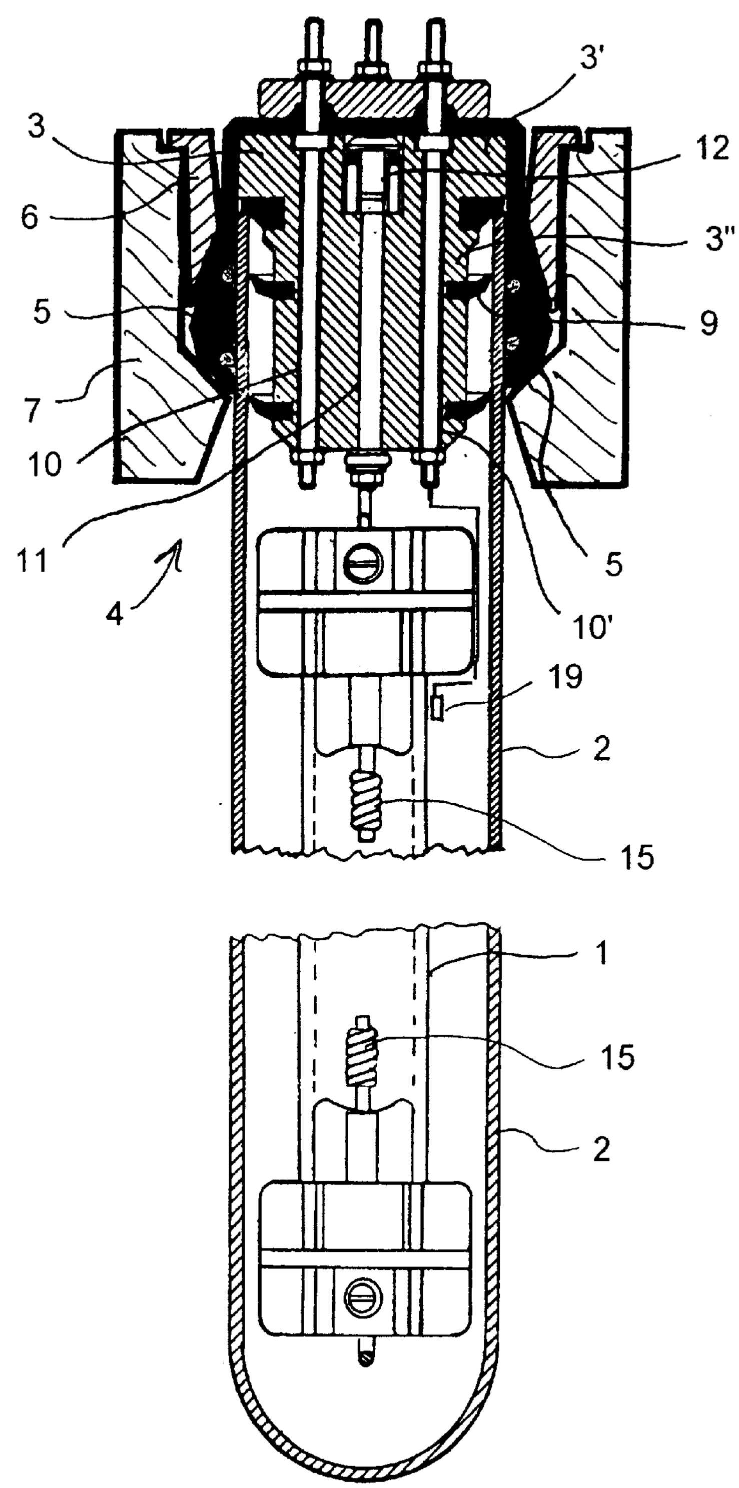
FIG. 1 shows an assembly drawing of a socket composed of elements for a lamp device according to an embodiment of the invention, and FIG. 2 schematically shows a layout of a regulation device for a lamp device according to an embodiment of the invention.

Reference is now made more particularly to FIG. 1, which shows a UV lamp according to an embodiment of the invention where a lamp tube 1 is mounted in an outer globe 2 of quartz glass which, at the top, has an opening closed by a socket 4 comprising a plug 3 which is partly inserted into the opening of the outer globe 2.

The lamp is mounted via the socket 4 in a reception opening in a lamp holder or the like. The socket 4 comprises a plurality of mounting elements in the form of rings 6, 7 which are arranged in a water and air-sealing manner around the opening of the outer globe 2 of quartz glass. A sealing cap 5, which closes the end of the outer globe in a vacuum-sealing manner, is arranged exteriorly on the end of the outer globe 2 and the socket 4. Optionally, O-rings may be embedded in the cap.

A sleeve portion of the cap provides an exterior peripheral bulge, delimited by outer tapered faces with opposing taper angles matched to the tapers of the cooperating clamping ring 6 and the mounting ring 7, respectively. The sealing cap 5 is preferably made of a rubber material, and the clamping ring is preferably made of stainless steel or a similar corrosion resistant material. During assembly, the clamping ring 6 is wedged between the mounting ring 7 and the sealing cap 5, which provides the rest of the socket 4. At least a portion of the outer side of the mounting ring 7 may be provided with threads for mounting in the reception opening.

As will appear, the plug 3 consists of an end part 3' and a protruding insertion part 3", which is adapted for fitting inside the opening of the outer globe 2 of quartz glass. The insertion part 3" is provided with a plurality of ring-shaped barb flanges 9, adapted for engaging the outer globe 2 of quartz glass in order to resist withdrawal once the plug 3 has been mounted.

The plug 3 is provided with channels 10, 10', and 11 for various purposes. At least two connecting channels accommodate electrical connections to the lamp tube 1 (see FIG. 1). Additional connecting channels 10' of a type similar to the channels 10 for electrical connection may be provided. These additional connecting channels 10' allow for arranging sensor means for e.g. temperature measurement inside the outer globe 2 of quartz glass, preferably of the inactive gas in the outer globe 2 near the surface of the lamp tube 1. Moreover, a valve channel, in which a vacuum valve 12 is seated, may be provided.

A lamp device according to the invention provides considerable savings in connection with particularly UV lamps for photochemical process systems since the service life may be expected to be prolonged from normally about 1–3,000 hours up to 24,000 hours, and the state of the lamp tube may currently be controlled and the lamp may be regulated, e.g. through temperature control of the inactive gas in the outer tube.

A lamp tube contains an inactive gas. It is provided with electrodes 15 at each end. According to a preferred embodiment of the invention, the gas in the lamp tube 1 is dosed with a halogen material, instead of mercury. The selection of dosing material depends on the purpose for which the lamp tube is to be used, as it has been discovered that a great light intensity in desired wavelengths of ultraviolet light may be achieved by suitable selection of material in the dosing. As dosing material, e.g. bromoxide, ferric oxide, mercury, amalgam or the like, metals/metal oxides as well as halogens may be mentioned. In case of halogens where the temperature may reach 1650° C., which exceeds the melting temperature of quartz glass, use is made of lamp tubes of aluminum ceramic oxide with a binder such as MgF or $Li_2F$ which allows passage of UV light in the low range, e.g. 100–300 nm, it being intended that the lamp is as transparent as possible to avoid internal reflection of photons.

Figure 2:
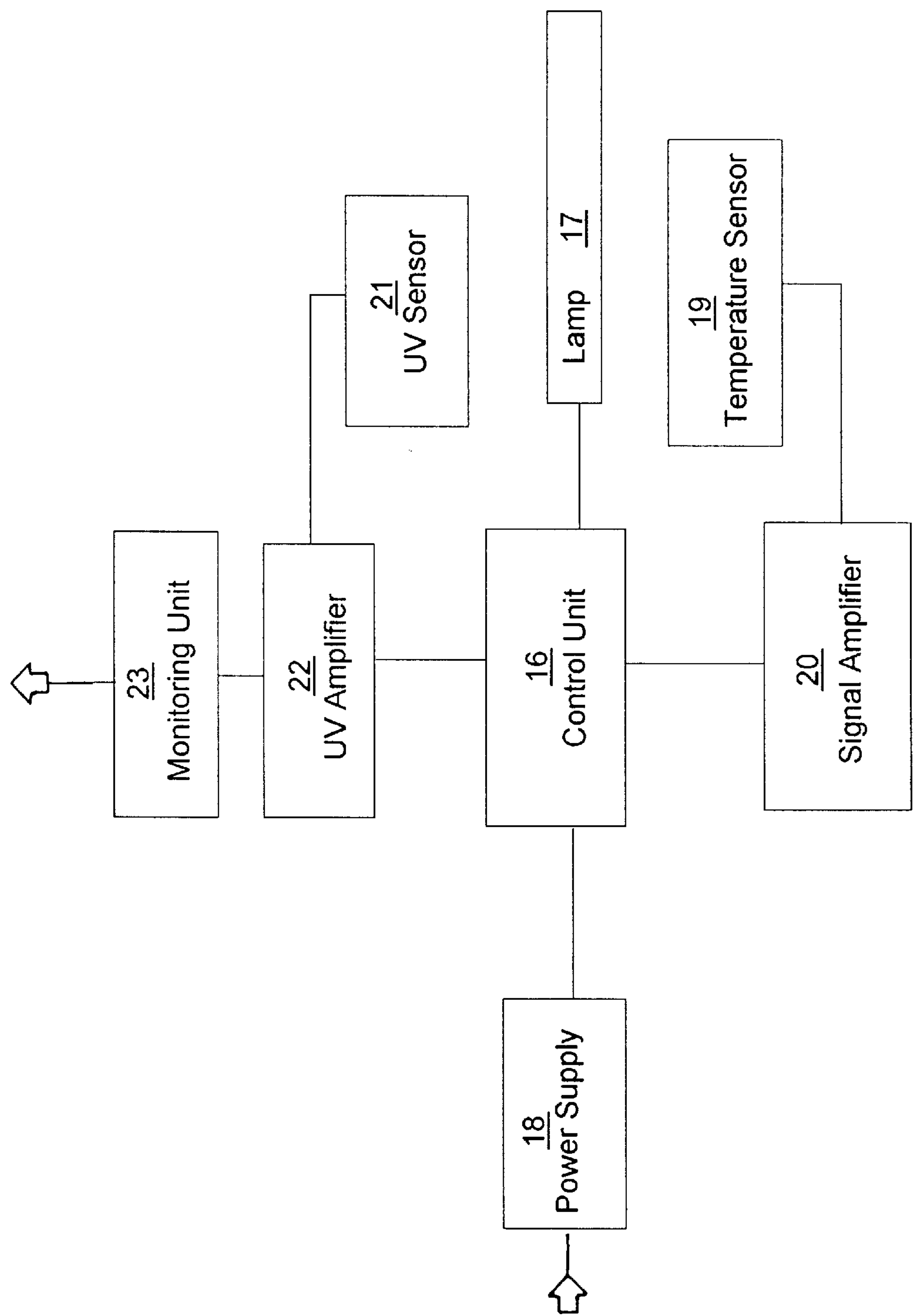

FIG. 2 shows an electronic control unit 16 which, in the embodiment shown, is preferably a high-frequency controllable switch mode ballast for controlling the lamp 17. The control unit is connected to a power supply 18 which is preferably a phase-compensated double rectifier with incorporated EMC filter.

Adjacent the lamp 17 near the surface of the lamp, a temperature sensor 19 is arranged for measuring the inactive gas temperature. The temperature sensor 19 is connected to a signal amplifier 20 which amplifies the temperature measurement from the sensor 19 and sends the amplified signal to the control unit 16.

In the embodiment shown, a UV light sensor 21, preferably with a measurement range of 200 nm to 400 nm, is arranged adjacent the lamp 17. The signal from the UV sensor is amplified in a UV intensity amplifier 22, which sends the amplified UV signal to the control unit 16.

The control unit 16 is adapted for controlling the lamp 17 by regulating the tube voltage of the lamp on the basis of the signals fed to the unit 16. The control unit 16 may furthermore be connected to a control circuit 23 via which e.g. an operator can currently monitor the state of the lamp.

I claim:

1. A lamp device comprising a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, wherein said lamp tube is made of aluminum ceramic oxide with a binder that allows passage of electromagnetic radiation in the range 100–300 nm, and wherein said enclosed volume contains a filling of an inactive gas to a pressure of 500 mB.

2. The lamp device according to claim 1, wherein said inactive gas is selected from the group consisting of nitrogen, argon, helium and xenon.

3. The lamp device according to claim 1, wherein said plug comprises a channel and a vacuum valve arranged in said channel, adapted for permitting selective opening for the purpose of scavenging said enclosed volume.

4. The lamp device according to claim 1, wherein said inner part comprises exterior, ring-shaped barb flanges.

5. The lamp device according to claim 1, comprising a temperature sensor means arranged near the surface of the lamp tube and provided with means for connection passed through said plug, in order to adapt the lamp for temperature measurement inside said outer globe.

6. The lamp device according to claim 1, wherein said sealing means comprises at least one clamping ring, which encloses said inner part.

7. The lamp device according to claim 1, wherein said socket assembly comprises a rubber cap.

8. The lamp device according to claim 1, wherein said binder comprises MgF.

9. The lamp device according to claim 1, wherein said binder comprises $Li_2F$.

10. A lamp device comprising a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, and wherein said plug comprises a channel and a vacuum valve arranged in said channel, adapted for permitting selective opening for the purpose of scavenging said enclosed volume.

11. The lamp device according to claim 10, wherein said enclosed volume contains a filling to a pressure of 500 mB of an inactive gas.

12. The lamp device according to claim 10, wherein said lamp tube is made of aluminum ceramic oxide with a binder that allows passage of electromagnetic radiation in the range 100–300 nm.

13. The lamp device according to claim 10, wherein said inner part comprises exterior, ring-shaped barb flanges.

14. The lamp device according to claim 10, comprising a temperature sensor means arranged near the surface of the lamp tube and provided with means for connection passed through said plug, in order to adapt the lamp for temperature measurement inside said outer globe.

15. The lamp device according to claim 10, wherein said sealing means comprises at least one clamping ring, which encloses said inner part.

16. The lamp device according to claim 10, wherein said enclosed volume contains a filling of a gas selected from the group consisting of nitrogen, argon, helium and xenon.

17. A system comprising a lamp device, which lamp device comprises a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, and wherein said lamp tube is made of aluminum ceramic oxide with a binder that allows passage of electromagnetic radiation in the range 100–300 nm, said enclosed volume comprising a filling of inactive gas, a temperature sensor inside said outer globe for temperature measurement of said filling of inactive gas and control means for controlling a voltage fed to said lamp tube in order to control the intensity of the electromagnetic radiation in selected wavelengths.

18. The system according to claim 17, wherein said control means comprises a control unit adapted for receiving temperature measurements from the temperature sensor and for feeding a tube voltage to said lamp tube, suitable to achieve a desired surface temperature.

19. The system according to claim 18, comprising a light meter connected to said control unit.

20. The system according to claim 18, wherein said control unit is provided with a temperature control, adapted to prevent an undesirable change in the tube voltage of the lamp once the ideal surface temperature of the lamp has been reached, in order to prevent overloading the lamp.

21. The system according to claim 18, comprising a monitoring unit connected to said control unit.

22. The system according to claim 18, comprising a UV sensor connected to said control unit.

23. A method of regulating the intensity of electromagnetic radiation in selected wavelengths from a lamp device, which lamp device comprises a lamp tube, an outer globe provided with at least one end opening, and a socket assembly, wherein said socket assembly comprises a plug adapted for closing said outer globe end opening in order to define together with said outer globe a generally enclosed volume adapted for containing said lamp tube, wherein said enclosed volume contains a filling to a pressure of 500 mB of an inactive gas, wherein said socket assembly is provided with electrical connections to said lamp tube, wherein said plug comprises an inner part inserted into said outer globe and attached to said lamp tube, and an outer part, wherein said outer part comprises sealing means adapted for providing mutual vacuum-tight mounting of said socket against said outer globe, and wherein said lamp tube is made of aluminum ceramic oxide with a binder that allows passage of electromagnetic radiation in the range of 100–300 nm, said method comprising measuring a temperature at a point inside outer globe and controlling the voltage fed to said lamp tube in order to maintain a predetermined temperature as measured at said point.

24. The method according to claim 23, wherein the gas temperature is measured near the surface of the lamp tube.

25. The method according to claim 23, wherein said binder comprises MgF.

26. The method according to claim 23, wherein said binder comprises $Li_2F$.

* * * * *